United States Patent [19]

Ferrill, Jr. et al.

[11] 3,936,315

[45] Feb. 3, 1976

[54] CONVERSION OF CRUDE PHTHALOCYANINES INTO PIGMENTS

[75] Inventors: Richard Milledge Ferrill, Jr., Glen Falls, N.Y.; Louis John Gagliano, Wilmington, Del.

[73] Assignee: Hercules Incorporated, Wilmington, Del.

[22] Filed: Nov. 4, 1974

[21] Appl. No.: 521,003

[52] U.S. Cl. ............................................. 106/309
[51] Int. Cl.² .......................................... C09B 47/04
[58] Field of Search ..................................... 106/309

[56] References Cited
UNITED STATES PATENTS

| | | | |
|---|---|---|---|
| 2,723,981 | 11/1955 | Tullsen | 106/309 X |
| 3,201,051 | 8/1965 | Manger et al. | 106/309 X |
| 3,351,481 | 11/1967 | Hopmeier et al. | 106/309 X |
| 3,353,977 | 11/1967 | Kranz et al. | 106/309 X |
| 3,437,503 | 4/1969 | Massam et al. | 106/309 |
| 3,523,030 | 8/1970 | Malin et al. | 106/309 X |
| 3,647,496 | 3/1972 | Bagai et al. | 106/309 |
| 3,748,164 | 7/1973 | Akamatsu et al. | 106/309 X |
| 3,752,688 | 8/1973 | Fuchs et al. | 106/309 |
| 3,758,320 | 9/1973 | Flores | 106/309 X |

Primary Examiner—Winston A. Douglas
Assistant Examiner—William G. Wright
Attorney, Agent, or Firm—Hazel L. Deming

[57] ABSTRACT

A salt grinding process is described for converting crude phthalocyanines into pigments having improved strength, cleanliness and transparency. The process is carried out by grinding an anhydrous charge of dry phthalocyanine crude, salt grinding aid, organic liquid conditioning agent and a specified amount of an alkali metal hydroxide under conditions of shear and then recovering the pigment from the charge. The process is particularly useful for crudes of unsubstituted or halogen substituted copper phthalocyanines.

8 Claims, No Drawings

CONVERSION OF CRUDE PHTHALOCYANINES INTO PIGMENTS

This invention relates to a process for conditioning crude organic pigments and particularly to a process for converting phthalocyanine crudes into pigments having exceptional tinctorial strength, cleanliness and transparency.

The crude reaction products of phthalocyanine-forming reactants as obtained from their various syntheses are not suitable for direct use as pigments and require conditioning before acceptable pigmentary properties are attained.

One method for converting crude (non-pigmentary) phthalocyanines into pigments is described in U.S. Pat. No. 2,982,666 to Chun et al. (May 2, 1961) and involves grinding the dry crude with a finely-divided salt grinding aid such as sodium chloride in the presence of a sufficient amount of an organic conditioning agent such as polyethylene glycol to provide a doughy, coherent mass under conditions of high shear until a pigment possessing the desired tinctorial strength is obtained. Modifications of the above salt grinding method have also been proposed to improve various properties of the pigment. For example, in U.S. Pat. No. 3,351,481 Nov. 7, 1967) Hopmeier et al. teach that pigments possessing high tinctorial strength and tinctorial stability in aromatic vehicles are obtained by carrying out the salt grinding in the presence of an organic solvent such as dimethyl sulfoxide, morpholine or a polyglycol amine. Another modification is shown by Akamatsu et al. in U.S. Pat. No. 3,748,164 (July 24, 1973) and proposes carrying out the salt grinding in the presence of an aminoplast tackifying agent such as urea, thiourea, melamine, etc., and optionally other additives such as water, diethylene glycol, surfactants, rosin, etc., to obtain brighter shades and superior tinctorial strength. The above prior art salt grinding techniques generally provide phthalocyanine pigments having a soft texture in the dry state, good dispersibility in oil or aqueous systems and good tinctorial strength. However, optimum properties are not realized with all crudes and in some cases, such as crudes which are not completely pure, the strength, cleanliness and transparency of the pigment leave much to be desired.

It has also been suggested that crude phthalocyanines can be converted into pigments having good strength, brilliance and high purity by grinding the crude in water. One such method is described in U.S. Pat. No. 3,752,688 to Fuchs et al. (Aug. 14, 1973) and involves steel ball milling crude phthalocyanines in aqueous medium containing 0.1 to 20% of an alkali metal hydroxide or carbonate. The presence of base in the aqueous medium is said to improve the transmission of grinding energy and to result in purer pigments of greater strength in shorter grinding times. The strength of pigment obtained by wet grinding, however, is much lower than by salt grinding. Furthermore, contamination frequently results, especially when the wet grinding is carried out with steel balls which are small in size.

Now in accordance with this invention it has been found that further improvement in the strength, cleanliness and transparency of phthalocyanine pigments can be realized by the salt grinding of crude provided the grinding is carried out in the presence of a substantial but minor amount of an alkali metal hydroxide. Accordingly, the present invention relates to a process for converting a phthalocyanine crude into a pigment having high tinctorial strength, cleanliness and transparency, which process comprises grinding under conditions of shear an essentially anhydrous charge comprising dry phthalocyanine crude, from about 2 to about 8 parts per part of crude of a particulate salt grinding aid, from 0.1 to 0.6 part per part of crude of an alkali metal hydroxide and sufficient of an organic liquid conditioning agent to form a dough-like cohesive mass and to maintain the charge under conditions of shear during grinding until a pigment of high tinctorial strength is obtained, and recovering the pigment from the ground charge.

The crude phthalocyanines which can be conditioned in accordance with this invention include the metal-free or metal phthalocyanines, and particularly the copper, nickel, cobalt, zinc, aluminum, tin and manganese phthalocyanines. The phthalocyanine nucleus can be unsubstituted or substituted, for instance, with halogen or sulfonic acid groups. The invention is particularly useful for crudes of unsubstituted copper phthalocyanine and the halogen substituted copper phthalocyanines.

The phthalocyanine crudes can be prepared conventionally using well-known solvent or fusion techniques and can be preground as by dry hammer milling prior to conditioning to break up large lumps or oversized material and provide a crude of more uniformly sized particles, if desired. Pregrinding, however, is not essential to the practice of the invention. Likewise, other pretreatments designed to remove impurities, synthesis byproducts and the like can be used if desired but are not necessary.

As stated, dry phthalocyanine crude is ground under conditions of shear in the presence of about 2 to about 8 parts of a particulate salt grinding aid and from 0.1 to 0.6 part of an alkali metal hydroxide per part of crude and sufficient of an organic liquid conditioning agent to form a dough-like cohesive mass and to maintain shear conditions. Grinding is continued until a pigment of high tinctorial strength is obtained and the exact time period employed will, of course, vary depending upon such factors as the type and particle size of crude, efficiency and power input of the grinding apparatus, viscosity of the grinding mass, particle size of the grinding aid, etc. Usually the time will vary from about 1 hour to about 24 hours and preferably from about 4 to about 12 hours. Extended grinding is not harmful but grinding beyond 24 hours is not necessary under usual conditions.

The temperature during grinding is not critical and can vary over a considerable range. It is preferred, however, for reasons of economy to operate between a temperature range of about 20° to 140°C. and more preferably about 40° to 125°C.

As stated, grinding is carried out under conditions of shear. Forces which are shearing in nature can be realized using known grinding or milling apparatus such as the Baker Perkins sigma mixer, the Werner-Pfleiderer sigma mixer, the Banbury mixer or a continuous heavy duty mixer of the Baker Perkins M-P or Ko-Kneader type. Usually, any mixing apparatus which is capable of delivering a power input of at least 0.10 H.P. per pound of pigment in the crude will be adequate to provide shear conditions in accordance with the invention.

The grinding step of the invention utilizes a particulate salt as the solid grinding aid. Preferred grinding aids are the water-soluble salts of mineral acids such as an alkali metal halide, sulfate or phosphate and particularly sodium and potassium chlorides, sulfates, acid sulfates, phosphates, acid phosphates and the like. The salt will usually be in finely divided form and the amount can be varied within relatively wide limits. Usually from about 2 to about 8 parts, and preferably from 2 to 6 parts, per part of crude will be employed.

As stated, salt grinding of the crude in accordance with this invention is carried out in the presence of from 0.1 to 0.6 part per part of crude of an alkali metal hydroxide. Preferred alkali metal hydroxides are sodium, potassium and lithium hydroxide, and particularly preferred is sodium hydroxide flake. The exact amount of alkali necessary within the limits recited to achieve the advantages of the invention will depend upon the particular phthalocyanine crude and the amount of pigment contained therein. In general copper phthalocyanine crudes give pigments of exceptional strength when the amount of alkali hydroxide is at least equal on a weight basis to the amount of impurity present in the crude. An excess is not detrimental but large excesses and usually more than a two-fold excess does not appear to offer additional improvement.

The anhydrous charge which is ground in accordance with this invention also comprises, in addition to the phthalocyanine crude, salt grinding aid and alkali metal hydroxide, sufficient of at least one organic liquid conditioning agent to provide cohesiveness during mixing and to maintain conditions of shear. Ideally the conditioning agent should be at least slightly water-soluble or readily separable from the pigment and should have a low volatility under grinding conditions. Conditioning agents having the above properties are well known to the art and include alcohols, ethers, ketones, aliphatic and aromatic hydrocarbons, halogenated hydrocarbons, amines, amides, etc. Crystallizing type organic liquids which are known to permit transformation of phthalocyanine pigment to a different polymorphic form and hence alter the shade of the pigment can be used as all or part of the conditioning agent. Preferred liquid conditioning agents of the non-crystallizing type include ethylene glycol, triethylene glycol, diethanolamine, triethanolamine, glycerol, and the like, and the preferred crystallizing type liquids include aniline, N-methyl-2-pyrrolidone, xylene, nitrobenzene, chlorobenzene and cyclohexanol. If a mixture of crystallizing and non-crystallizing type liquids is employed, the mixture will preferably contain about 10 to about 80%, and most preferably about 10 to about 50%, of crystallizing type liquid.

In order to maintain conditions of shear during grinding of the charge, it is important that the proper amount of conditioning agent be present. If too little conditioning agent is employed based on the weight of solids, the charge will remain powdery and grinding will not produce sufficient energy to reduce the particle size and give the desired conditioned pigment. On the other hand, if too high a proportion of conditioning agent is added, the power input will fall off due to loss of viscosity and grinding likewise will not give the desired conditioned pigment. When sufficient conditioning agent is present to form a dough-like cohesive mass, a high amount of energy is required to grind the charge and shear is developed. It is the grinding of the charge under conditions of shear in the presence of an alkali metal hydroxide which conditions the crude to give the superior pigments of this invention. For most charges, from about 3 to about 25% and preferably from about 10 to about 20% of conditioning agent based on the total solid constituents of the charge, i.e., the phthalocyanine crude, salt grinding aid and alkali hydroxide, will provide the cohesiveness necessary for grinding under conditions of shear.

Following grinding of the crude in the presence of the salt, alkali metal hydroxide, and conditioning agent, the conditioned pigment can be separated from the ground charge by conventional techniques. Generally the charge is treated with water or dilute acid to dissolve the salt grinding aid, alkali metal hydroxide and liquid conditioning agent, and the treated charge filtered, washed and dried to yield the desired pigment.

The phthalocyanine pigments produced in accordance with this invention possess outstanding quality in terms of shade, intensity, cleanliness, transparency and dispersibility, and are particularly useful as colorants for printing inks, coating compositions, plastics and the like. Because of their high transparency and strength they are particularly important in fluid ink and similar applications requiring high gloss and/or iridescent effects.

The invention is further illustrated by the following examples. All parts and percentages are by weight unless otherwise indicated.

EXAMPLE 1

Into a Baker Perkins sigma mixer (Model No. 4AN2) having a working capacity of 0.7 U.S. gallon were charged:

|  | Parts |
| --- | --- |
| Sodium chloride (325 mesh) | 787 |
| Sodium hydroxide flake (98.3%) | 30 |
| Crude copper phthalocyanine (89.7% pure; 0.03% chlorine) | 263 |
| Ethylene glycol | 145 |
| Aniline | 39 |

Mixing was commenced and the charge was ground for 6½ hours without cooling, 66 additional parts of ethylene glycol being added in small increments during the grinding period to maintain the charge in a cohesive state. A strong evolution of ammonia occurred during the first hours of grinding and the temperature of the charge rose to 75°C. After the 6½ hour period, grinding was terminated and 50 parts of the grind were withdrawn and mixed with 1,000 parts of water containing 21 parts of 93% sulfuric acid. The mixture was stirred for 1 hour at 85°–90°C., and the pigment was recovered by filtration, washed with water until neutral, dried at 70°C. and pressed through a 60-mesh screen. The product was a bright blue, green shade beta-copper phthalocyanine pigment.

The pigment of this example and a control pigment prepared as above except that no sodium hydroxide was used were evaluated for strength and transparency in litho varnish using the following procedure. Masstone inks were prepared by mixing 0.5 part of dry pigment color and 0.9 part of litho varnish and mulling for 300 revolutions on a Hoover Muller. The masstone inks and tint inks therefrom (made by mixing one part of the masstone ink with 50 parts of white ink) were drawn down on glass slides and on paper and compared. The masstone strength of the ink prepared with the pigment of this example was cleaner and more transparent than the ink prepared with the control pigment. The tint strength of the ink from the pigment of this example was slightly stronger than the tint ink from the control pigment.

EXAMPLE 2

The procedure of Example 1 was repeated except that no aniline was present in the charge, the amount of additional ethylene glycol added to maintain the charge cohesive during the grinding was 39 parts, and the temperature during grinding rose to 81°C. The pigment of this example was a mixture of alpha and beta copper phthalocyanine and gave with litho varnish a very strong transparent, clean, reddish blue masstone ink. The tint ink was redder, about 5 parts stronger and much cleaner than the tint ink from a control pigment prepared in the same manner as above except that no sodium hydroxide was used, 26 parts of additional ethylene glycol were added during the grinding, and the temperature rose to 63°C.

EXAMPLE 3

The procedure of Example 1 was repeated except the mixer was charged with:

|  | Parts |
|---|---|
| Sodium chloride (325 mesh) | 960 |
| Sodium hydroxide flake (98.3%) | 37 |
| Crude copper phthalocyanine hammer milled through a 1/16" screen (94.7% pure, 0.43% chlorine) | 168 |
| Ethylene glycol | 215 |

The grinding time was 8 hours with jacket cooling, additional ethylene glycol was not added incrementally, 11 parts of ethylene glycol were added after 6½ hours of grinding time and the maximum temperature during grinding was 56°C. The pigment was red shade alpha-copper phthalocyanine which gave with litho varnish a cleaner masstone ink which was a brighter reddish blue shade than the masstone ink of a control pigment prepared in the same manner except that no sodium hydroxide was used. The tint ink of the pigment of this example was stronger and cleaner than the tint ink of the control pigment.

EXAMPLE 4

The procedure of Example 1 was repeated except that the charge contained 60 parts of sodium hydroxide, 129 parts of ethylene glycol were necessary to maintain cohesiveness, the grinding time was 9 hours and the temperature rose to 95°C. The resulting pigment was beta-copper phthalocyanine which gave masstone and tint inks which were very strong and clean. The pigment was comparable to the pigment of Example 1.

EXAMPLE 5

The procedure of Example 1 was repeated except that the mixer was charged with:

|  | Parts |
|---|---|
| Sodium chloride (325 mesh) | 1240 |
| Sodium hydroxide flake (98.3%) | 47 |
| Crude copper phthalocyanine hammer milled through a 1/32" screen (92.4% pure, 0.11% chlorine) | 230 |
| Ethylene glycol | 238 |
| Aniline | 36 |

The grinding time was 9 hours, no additional ethylene glycol was added during grinding, and the temperature rose to 70°C. The pigment was green beta-copper phthalocyanine which gave with litho varnish a masstone ink which was much cleaner, stronger and more transparent than the masstone ink of a control pigment prepared in the same manner of this example except that sodium hydroxide was omitted from the charge, 208 parts of ethylene glycol were added initially and 11 parts of ethylene glycol were added after 55 minutes of grinding and the temperature rose to 61°C. The tint ink of the pigment of this example was much stronger and much cleaner than the control tint ink.

EXAMPLE 6

The procedure of Example 5 was repeated except that 208 parts of triethylene glycol were substituted for the 238 parts of ethylene glycol and the temperature rose to 84°C. The masstone and tint inks of pigment of this example were comparable in shade, strength and cleanliness to the inks of the pigment of Example 5.

EXAMPLE 7

The procedure of Example 5 was repeated except that an equal amount ot triethanolamine was substituted for the ethylene glycol, an additional 40 parts of triethanolamine were added in small increments during the grinding period and the temperature rose to 80°C. The masstone and tint inks of the pigment of this example were comparable in shade, strength and cleanliness to the inks of the pigment of Example 5.

EXAMPLE 8

A jacketed Baker Perkins mixer (Model No. 6CWE) having a working capacity of 2.25 U.S. gallons, cooling water running through the jacket and the mixer blades set at a speed of 45 r.p.m. for the front blade and 30 r.p.m. for the back blade was charged sequentially with 3180 parts of sodium chloride (325 mesh), 2080 parts of fusion synthesized copper phthalocyanine crude having a purity of 68.1% and containing 0.5% chlorine (prepared according to Example 1 of U.S. Pat. No. 3,188,318 to Mack, June 8, 1965, and hammer milled through a 1/32 inch screen) and 3180 parts of sodium chloride (325 mesh). Grinding was commenced and after 5 minutes of time 458 parts of sodium hydroxide flake (98.3%) were added to the mixture and a nitrogen atmosphere was provided over the mixer contents. Grinding was continued for 15 minutes following which time 1100 parts of diethanolamine (m.p. 26°–28°C.) were charged to the mixer. Grinding was continued for 10 minutes, 225 parts of aniline were charged to the mixer, and grinding was continued for an additional 7 hours, sodium chloride (325 mesh) being added in the amount of 50 parts after 5 hours and 5¼ hours respectively. During gringing the batch temperature rose to 107°C. and the net power input to the mixer rose to a maximum of 1.77 H.P. After the 7 hour grinding period, grinding was terminated and 25 parts of the ground mixture were withdrawn and stirred with 500 parts of water containing 21 parts of 93% sulfuric acid at 85°–90°C. for 1 hour, following which time the pigment was recovered using the procedure of Example 1. When tested in litho varnish, the masstone and tint inks of the pigment of this example gave a very green, clean color comparable in strength, cleanliness and transparency to the inks of the pigment of Example 1.

EXAMPLE 9

Example 8 was repeated except that the initial charge was

|  | Parts |
|---|---|
| Sodium chloride (325 mesh) | 5360 |
| Crude copper phthalocyanine, finely ground (75.4% pure, 0.01% chlorine) | 1915 |
| Chlorinated copper phthalocyanine (purified by acid pasting, 11.5% chlorine) | 121 |
| Sodium hydroxide flake (98.3%) | 458 |
| Diethanolamine (m.p. 26–28°C.) | 800 |
| Aniline | 252 |

The grinding time was 7½ hours, an additional 1000 parts of sodium chloride were added after 1¾ hours of grinding, an additional 136 parts of diethanolamine were added incrementally as 12 or 25 part portions during the first 3 hours of grinding, and the batch temperature rose to 80°C. The product of this example was a green beta-copper phthalocyanine pigment containing 1.0% chlorine. The pigment gave a very green, clean, transparent masstone ink. The masstone and tint inks were comparable to the inks of Example 5.

EXAMPLE 10

The procedure of Example 9 was repeated except that the initial charge was

|  | Parts |
|---|---|
| Sodium chloride (325 mesh) | 6360 |
| Crude copper phthalocyanine, finely ground (75.4% pure, 0.01% chlorine) | 2080 |
| Sodium hydroxide flake (98.3%) | 458 |
| Diethanolamine (m.p. 26–28°C.) | 974 |
| N-methyl-2-pyrrolidone | 200 |

The grinding time was 7½ hours, an additional 350 parts of salt were added after 1⅓ hours, an additional 300 parts of diethanolamine were added in 5, 10 or 25 part increments over a 7 hour period to maintain cohesiveness, and the batch temperature rose to 112°C. The product of this example was a green shade beta-copper phthalocyanine pigment. When tested in litho varnish, the pigment gave a very strong clean, transparent masstone ink. The tint ink was slightly less green than the tint ink of Example 9.

EXAMPLE 11

The procedure of Example 5 was repeated except that 36 parts of xylene were substituted for the 36 parts of aniline. The pigment of this example gave masstone and tint inks comparable to the inks of Example 5 in strength, cleanliness and transparency but slightly greener in shade.

What we claim and desire to secure by letters patent is:

1. A process for converting a phthalocyanine crude into a pigment having high tinctorial strength, cleanliness and transparency, which process comprises grinding under conditions of shear, an essentially anhydrous charge consisting essentially of dry phthalocyanine crude, from about 2 to about 8 parts per part of crude of a particulate salt grinding aid, from 0.1 to 0.6 part per part of crude of an alkali metal hydroxide and sufficient of at least one organic liquid conditioning agent to form a dough-like cohesive mass and to maintain the charge under conditions of shear during grinding until a pigment of high tinctorial strength is obtained, and recovering the pigment from the ground charge.

2. The process of claim 1 wherein the phthalocyanine is copper phthalocyanine.

3. The process of claim 2 wherein the alkali metal hydroxide is sodium hydroxide.

4. The process of claim 3 wherein the conditioning agent comprises ethylene glycol, triethylene glycol or triethanolamine.

5. The process of claim 4 wherein the conditioning agent also contains an organic crystallizing agent.

6. The process of claim 5 wherein the organic crystallizing agent is aniline.

7. The process of claim 5 wherein the organic crystallizing agent is N-methyl-2-pyrrolidone.

8. The process of claim 5 wherein the organic crystallizing agent is xylene.

* * * * *

UNITED STATES PATENT AND TRADEMARK OFFICE
CERTIFICATE OF CORRECTION

PATENT NO. : 3,936,315
DATED : February 3, 1976
INVENTOR(S) : Richard M. Ferrill, Jr. and Louis J. Gagliano Case 1

It is certified that error appears in the above-identified patent and that said Letters Patent are hereby corrected as shown below:

Column 3, line 35, insert " esters, " between -- ethers, ketones, --.

Signed and Sealed this sixth Day of April 1976

[SEAL]

Attest:

RUTH C. MASON
*Attesting Officer*

C. MARSHALL DANN
*Commissioner of Patents and Trademarks*